US011273866B2

(12) United States Patent
Murakami et al.

(10) Patent No.: US 11,273,866 B2
(45) Date of Patent: Mar. 15, 2022

(54) TORQUE SENSOR AND ELECTRIC POWER STEERING SYSTEM

(71) Applicant: HITACHI AUTOMOTIVE SYSTEMS, LTD., Hitachinaka (JP)

(72) Inventors: Hiroki Murakami, Atsugi (JP); Kohtaro Shiino, Isehara (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 321 days.

(21) Appl. No.: 16/335,984

(22) PCT Filed: Mar. 15, 2017

(86) PCT No.: PCT/JP2017/010454
§ 371 (c)(1),
(2) Date: Mar. 22, 2019

(87) PCT Pub. No.: WO2018/055806
PCT Pub. Date: Mar. 29, 2018

(65) Prior Publication Data
US 2020/0017140 A1 Jan. 16, 2020

(30) Foreign Application Priority Data
Sep. 23, 2016 (JP) .............................. JP2016-185110

(51) Int. Cl.
*B62D 6/10* (2006.01)
*G01L 3/10* (2006.01)
*G01L 5/22* (2006.01)

(52) U.S. Cl.
CPC ................ *B62D 6/10* (2013.01); *G01L 3/104* (2013.01); *G01L 5/221* (2013.01)

(58) Field of Classification Search
CPC ............ B62D 6/10; G01L 3/104; G01L 5/221
USPC ........................................................... 73/862
See application file for complete search history.

(56) References Cited

U.S. PATENT DOCUMENTS

2014/0076655 A1 *  3/2014  Yoshida ............... B62D 5/0463
                                                          180/446
2016/0016607 A1    1/2016  Yoshida et al.
2016/0083008 A1    3/2016  Murakami et al.

FOREIGN PATENT DOCUMENTS

| JP | 2009-271055 A | | 11/2009 | |
|---|---|---|---|---|
| JP | 2011257225 A | * | 12/2011 | |
| JP | 2013-160537 A | | 8/2013 | |
| JP | 2013160537 A | * | 8/2013 | |
| JP | 2014-055910 A | | 3/2014 | |
| JP | 2014-185933 A | | 10/2014 | |
| JP | 2016-060408 A | | 4/2016 | |
| WO | WO-2014148106 A1 | * | 9/2014 | ........... B62D 5/0421 |

OTHER PUBLICATIONS

Translation JP-2013160537-A (Year: 3013).*
Translation WO-2014148106-A1 (Year: 2014).*

* cited by examiner

*Primary Examiner* — Alexander A Mercado
*Assistant Examiner* — Monica S Young
(74) *Attorney, Agent, or Firm* — Foley & Lardner LLP (57) ABSTRACT

Provided is a torque sensor and an electric power steering system, which are capable of suppressing a detection property fluctuation between two magnetic sensors. A retaining portion is disposed at first and second magnetism collecting members in such a position as to be magnetically symmetrical with respect to first and second magnetic sensors.

14 Claims, 5 Drawing Sheets

TORQUE SENSOR AND ELECTRIC POWER STEERING SYSTEM

TECHNICAL FIELD

The invention relates to torque sensors and electric power steering systems.

BACKGROUND ART

A conventional torque sensor uses two magnetic sensors to detect a change in a magnetic flux which passes between a pair of magnetism collecting rings along with relative rotation of a pair of yokes (Patent Literature 1, for example).

CITATION LIST

Patent Literature

PTL 1: Japanese Unexamined Patent Application Publication No. 2016-60408

SUMMARY OF INVENTION

Technical Problem

With regard to the conventional art mentioned above, there has been a need to suppress a detection property fluctuation between the two magnetic sensors.

It is an object of the present invention to provide a torque sensor and an electric power steering system, which suppress a detection property fluctuation between two magnetic sensors.

Solution to Problem

In a torque sensor according to one embodiment of the invention, a retaining portion configured to retain first and second magnetism collecting members is disposed at the first and second magnetism collecting members in a direction around a rotation axis of a rotary member in such a position as to be magnetically symmetrical with respect to a first magnetic sensor and a second magnetic sensor or disposed to retain a first end portion of the first magnetism collecting member, a second end portion of the first magnetism collecting member, a first end portion of the second magnetism collecting member, and a second end portion of the second magnetism collecting member.

The torque sensor thus suppresses a detection property fluctuation between the two magnetic sensors.

DESCRIPTION OF EMBODIMENTS

Embodiment 1

Figure 1:
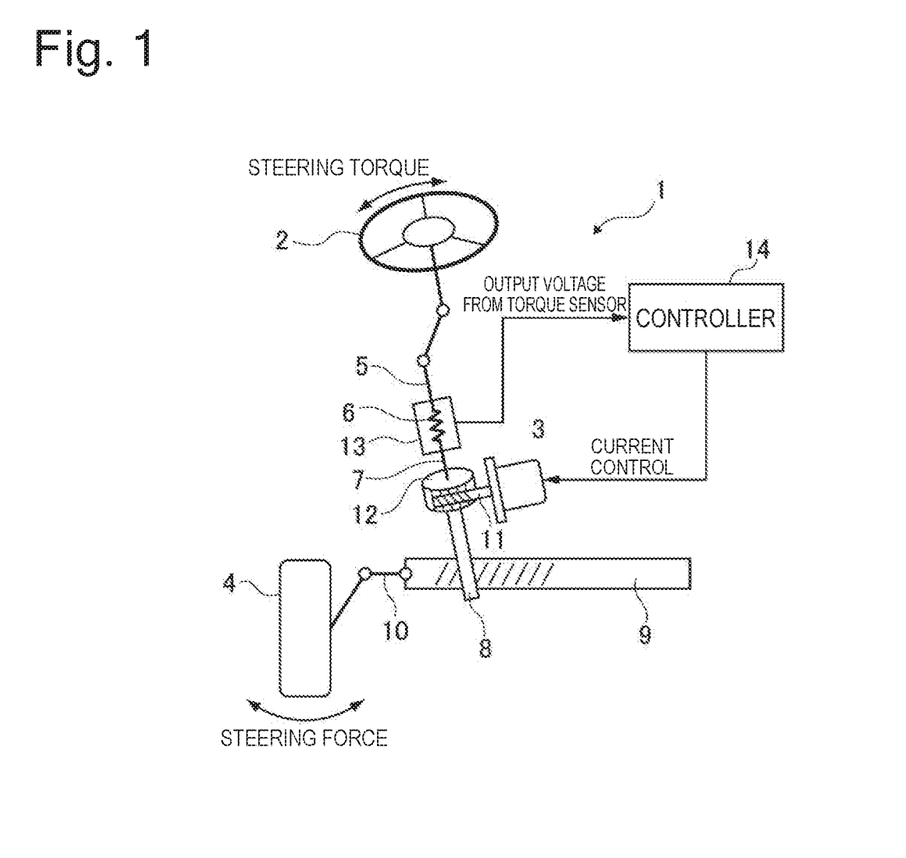
FIG. 1 is a configuration diagram of an electric power steering system according to an Embodiment 1.

FIG. 1 is a configuration diagram of an electric power steering system according to an Embodiment 1.

An electric power steering system 1 uses an electric motor 3 to add assist torque to steering torque which is input into a steering wheel 2 by a driver, and transmits to a steered wheel 4 the steering and assist torques as a steering force. The steering torque which is input into the steering wheel 2 is transmitted to the steered wheel 4 through an input shaft 5, a torsion bar 6, a pinion shaft 7, a pinion 8, a rack bar 9, and a tie rod 10. The input shaft 5, the torsion bar 6, the pinion shaft 7, the pinion 8, the rack bar 9, and the tie rod 10 form a steering mechanism 17. The input shaft 5 and the pinion shaft 7 form a rotary member 16. The assist torque which is output from the electric motor 3 is transmitted to the steered wheel 4 through a worm shaft 11, a worm wheel 12, the pinion 8, the rack bar 9, and the tie rod 10. A torque sensor 13 which detects the steering torque is disposed between the input shaft 5 and the pinion shaft 7. The torque sensor 13 outputs to a controller 14 a torque-sensor output voltage corresponding to the steering torque. The controller 14 computes target assist torque of the electric motor 3 on the basis of the torque-sensor output voltage, to thereby control current for driving the electric motor 3 according to the target assist torque.

Figure 2:
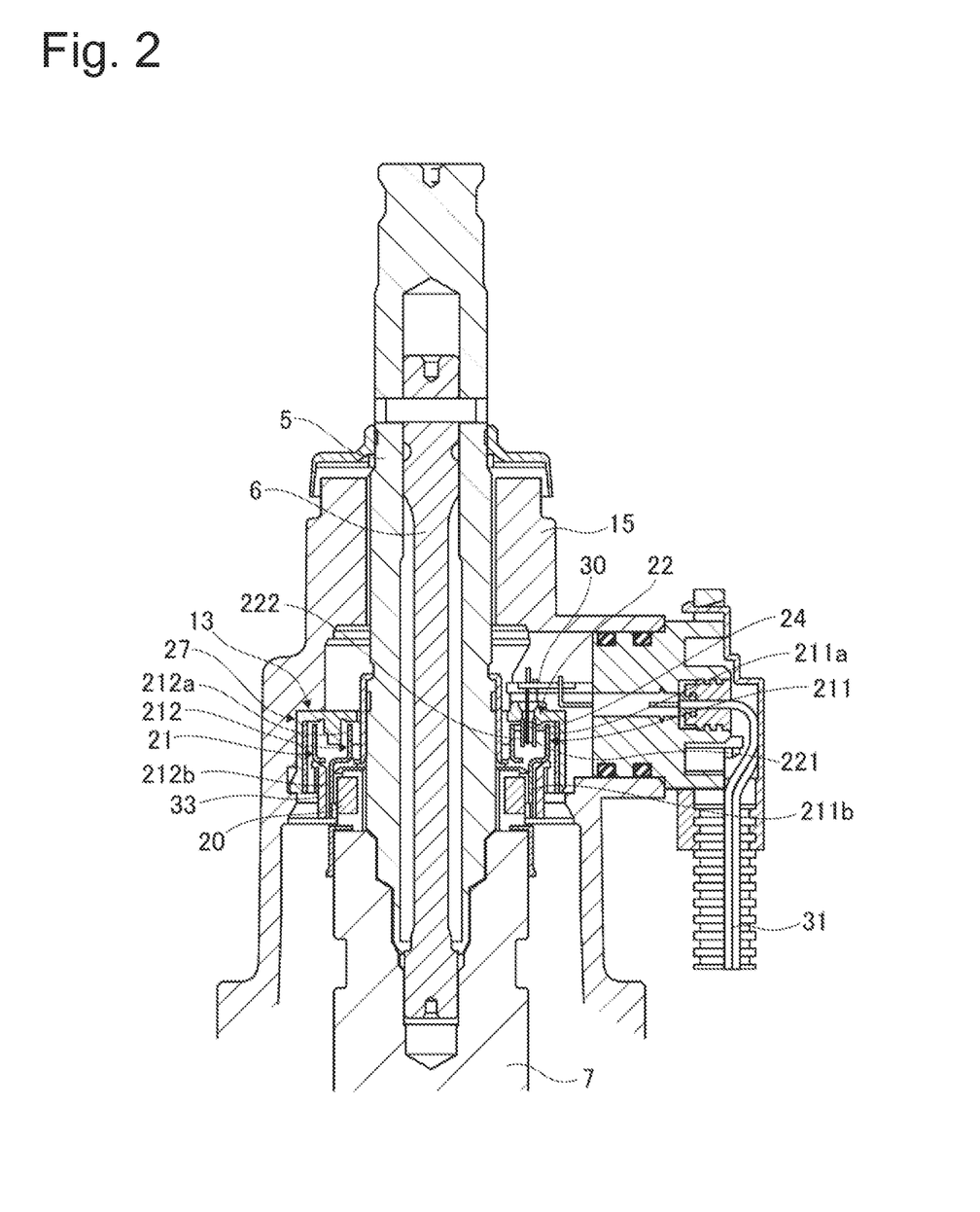
FIG. 2 is an axial cross-section view of a torque sensor 13 and its vicinity in the electric power steering system according to the Embodiment 1.

FIG. 2 is an axial cross-section view of the torque sensor 13 and its vicinity in the electric power steering system according to the Embodiment 1. Hereinafter, a direction of a rotation axis of the rotary member 16 will be referred to as an axial direction; a direction around the rotation axis of the rotary member 16 as a circumferential direction; and a radiation direction of the rotary member 16 as a radial direction.

The torque sensor 13 is accommodated in a steering gear box 15. The torsion bar 6 is fixed to the input shaft 5 at one end, and to the pinion shaft 7 at the other end. The input shaft 5 and the pinion shaft 7 are not directly connected together and are supported in a rotatable manner relative to each other. The input of the steering torque twists the torsion bar 6 and therefore causes difference in rotation amount between the input shaft 5 and the pinion shaft 7. The torque sensor 13 obtains the steering torque from the degree of the difference.

The pinion shaft 7 is provided with a magnet 20 formed into a circular ring. The magnet 20 has N and S poles alternately arranged in the circumferential direction. According to the Embodiment 1, the magnet 20 includes sixteen poles circumferentially arranged. The magnet 20 is rotated integrally with the pinion shaft 7.

The input shaft 5 is provided with a yoke member 21. The yoke member 21 is made of Permalloy (soft magnetic alloy). The yoke member 21 includes a first yoke member 211 and a second yoke member 212.

The first yoke member 211 includes a first ring portion 211a formed into a circular ring. The first ring portion 211a has a diameter larger than an external diameter of the magnet 20. The first yoke member 211 includes a first claw portion 211b which extends from the first ring portion 211a toward an inner circumference side in a curved manner and then extends in the axial direction. Eight first claw portions 211b are circumferentially arranged at regular intervals. The interval between every two adjacent first claw portions 211b is approximately the same as or slightly wider than a circumferential width of the first claw portion 211b. A circle formed by connecting outer circumferential surfaces of the first claw portions 211b in the circumferential direction has a diameter larger than the external diameter of the magnet 20.

The second yoke member 212 includes a second ring portion 212a formed into a circular ring. The second ring portion 212a has a diameter smaller than the external diameter of the magnet 20. The second yoke member 212 includes a second claw portion 212b which extends from the second ring portion 212a toward an outer circumference side in a curved manner and then extends in the axial direction. Eight second claw portions 212b are circumferentially arranged at regular intervals. The interval between every two adjacent second claw portions 212b is approximately the same as or slightly wider than a circumferential width of the second claw portion 212b. A circle formed by connecting outer circumferential surfaces of the second claw portions 212b in the circumferential direction has a diameter approximately equal to the diameter of the circle formed by connecting the outer circumferential surfaces of the first claw portions 211b in the circumferential direction.

The yoke member 211 and the second yoke member 212 are retained by a yoke holder 33. When the first yoke member 211 and the second yoke member 212 are retained by the yoke holder 33, the first ring portion 211a and the second ring portion 212a are coaxially disposed, and the first ring portion 211a is located on the outer circumference side of the second ring portion 212a. An inner circumferential surface of the first ring portion 211a and an outer circumferential surface of the second ring portion 212a radially face each other. The inner circumferential surface of the first ring portion 211a and the outer circumferential surface of the second ring portion 212a are located away from each other. When the first yoke member 211 and the second yoke member 212 are retained by the yoke holder 33, the second claw portions 212b are located between the respective two adjacent first claw portions 211b. In other words, the first claw portions 211b and the second claw portions 212b are alternately arranged.

The first yoke member 211 and the second yoke member 212 are mounted on the input shaft 5 while being retained by the yoke holder 33. The first yoke member 211 and the second yoke member 212 are rotated integrally with the input shaft 5. The first claw portions 211b and the second claw portions 212b are arranged on the outer circumference side of the magnet 20. The first claw portions 211b and the second claw portions 212b are arranged so that a width-directional center position of the first claw portion 211b and that of the second claw portion 212b are opposed to a boundary position between the N and S poles of the magnet 20.

A magnetism collecting member 22 is disposed between the first ring portion 211a of the first yoke member 211 and the second ring portion 212a of the second yoke member 212. The magnetism collecting member 22 is made of Permalloy. The magnetism collecting member 22 includes a first magnetism collecting member 221 and a second magnetism collecting member 222. The first magnetism collecting member 221 is radially opposed to the first ring portion 211a and disposed radially inside the first ring portion 211a. The first magnetism collecting member 221 is located away from the first ring portion 211a. The second magnetism collecting member 222 is radially opposed to the second ring portion 212a and disposed radially outside the second ring portion 212a. The second magnetism collecting member 222 is located away from the second ring portion 212a. The first magnetism collecting member 221 and the second magnetism collecting member 222 are disposed in the same plane orthogonal to the rotation axis of the input shaft 5.

Figure 3:
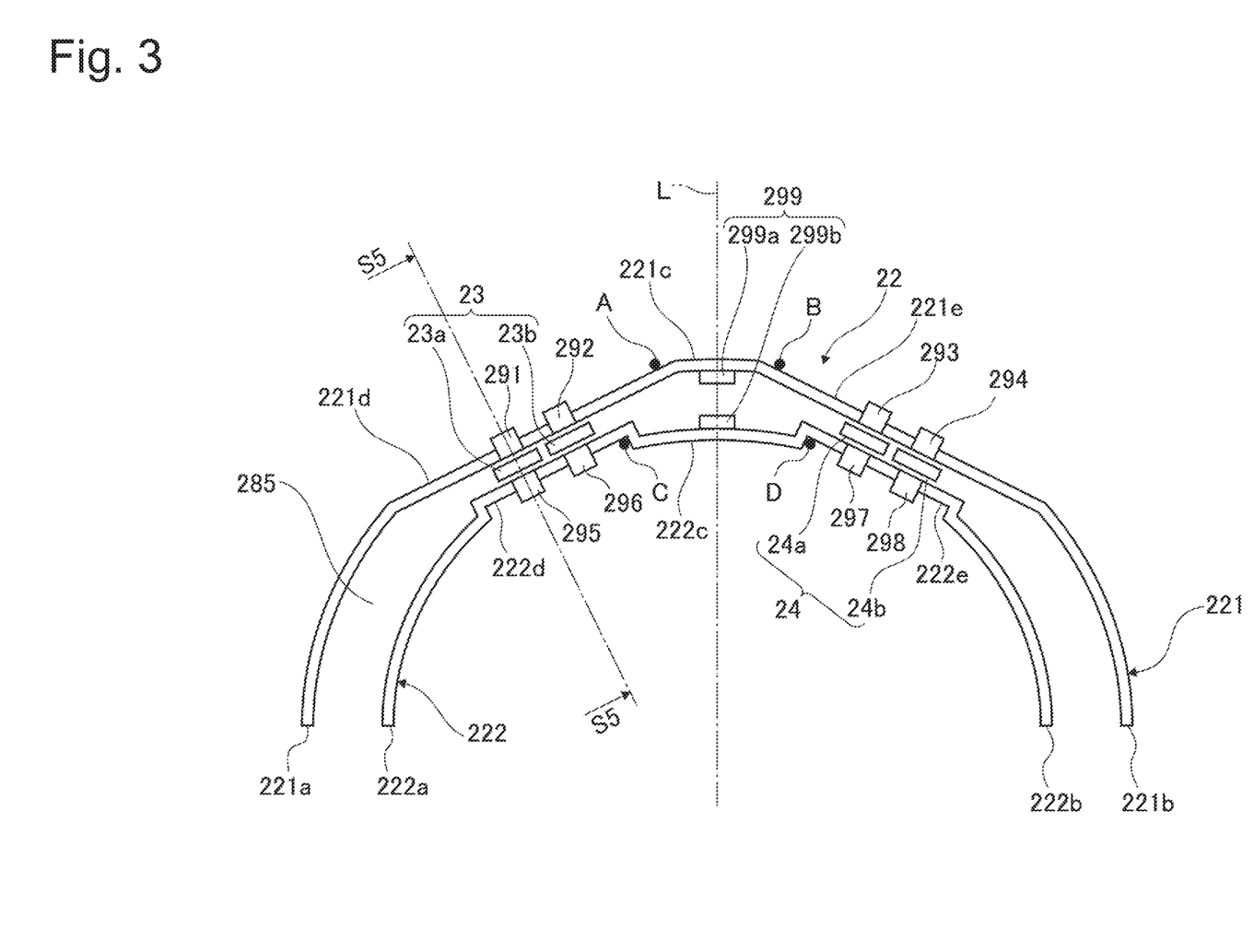
FIG. 3 is a plan view of a magnetism collecting member 22 according to the Embodiment 1.

FIG. 3 is a plan view of the magnetism collecting member 22 according to the Embodiment 1.

The first magnetism collecting member 221 is formed into a generally semicircular shape by bending metal sheet material made of Permalloy. The first magnetism collecting member 221 includes a pair of end portions (first end portion 221a, second end portion 221b), a first arch-shaped portion 221c, and two first straight portions 221d and 221e. The first magnetism collecting member 221 is formed into a shape symmetric across a straight line L (symmetrical axis) orthogonal to the rotation axis of the rotary member 16, as viewed in the axial direction. The first arch-shaped portion 221c is formed into an arch extending along the circumferential direction. The first straight portion 221d and the first straight portion 221e are arranged to be circumferentially symmetrical to each other with respect to the straight line L.

The second magnetism collecting member 222 is formed into a generally semicircular shape by bending metal sheet material made of Permalloy. The second magnetism collecting member 222 includes a pair of end portions (first end portion 222a, second end portion 222b), a second arch-shaped portion 222c, and two second straight portions 222d and 222e. The second magnetism collecting member 222 is formed into a shape symmetric across the straight line L as viewed in the axial direction. The second arch-shaped portion 222c is formed into an arch extending along the circumferential direction. The second straight portion 222d and the second straight portion 222e are arranged to be circumferentially symmetrical to each other with respect to the straight line L. The second straight portion 222d is radially opposed to the first straight portion 221d. The second straight portion 222e is radially opposed to the first straight portion 221e. The two second straight portions 222d and 222e are protruding radially further outward than the second arch-shaped portion 222c.

Disposed in a radial space between the first straight portion 221d and the second straight portion 222d is a first magnetic sensor 23. The first magnetic sensor 23 includes a first Hall IC 23a and a second Hall IC 23b. The first Hall IC 23a and the second Hall IC 23b are arranged parallel to the first straight portion 221d and the second straight portion 222d and circumferentially juxtaposed to each other. Disposed in a radial space between the first straight portion 221e and the second straight portion 222e is a second magnetic sensor 24. The second magnetic sensor 24 includes a third Hall IC 24a and a fourth Hall IC 24b. The third Hall IC 24a and the fourth Hall IC 24b are circumferentially arranged parallel to the first straight portion 221e and the second straight portion 222e. The first Hall IC 23a and the fourth Hall IC 24b are arranged symmetrically to each other with respect to the straight line L. Likewise, the second Hall IC 23b and the third Hall IC 24a are arranged symmetrically to each other with respect to the straight line L. More specifically, the positions where the first and second magnetic sensors 23 and 24 are arranged have magnetic symmetry (the positions are equal in magnetic environment, that is, in terms of the position of the magnet 20 and those of the claw portions 211b and 212b of the yoke member 21, and the positions relative to the magnetism collecting member 22, etc.). The Halls IC 23a, 23b, 24a and 24b are connected to a single circuit board 30. A harness 31 is connected to the circuit board 30. Output signals (torque sensor output voltage) of the Halls IC 23a, 23b, 24a and 24b are sent to the controller 14 through the harness 31.

The magnetism collecting member 22 is retained by the magnetism-collecting-member retaining member 28. The magnetism-collecting-member retaining member 28 is formed by injection-molding a resin material that is an insulating member. The magnetism-collecting-member retaining member 28 and the magnetism collecting member 22 form a magnetism collecting unit 27.

Figure 4:
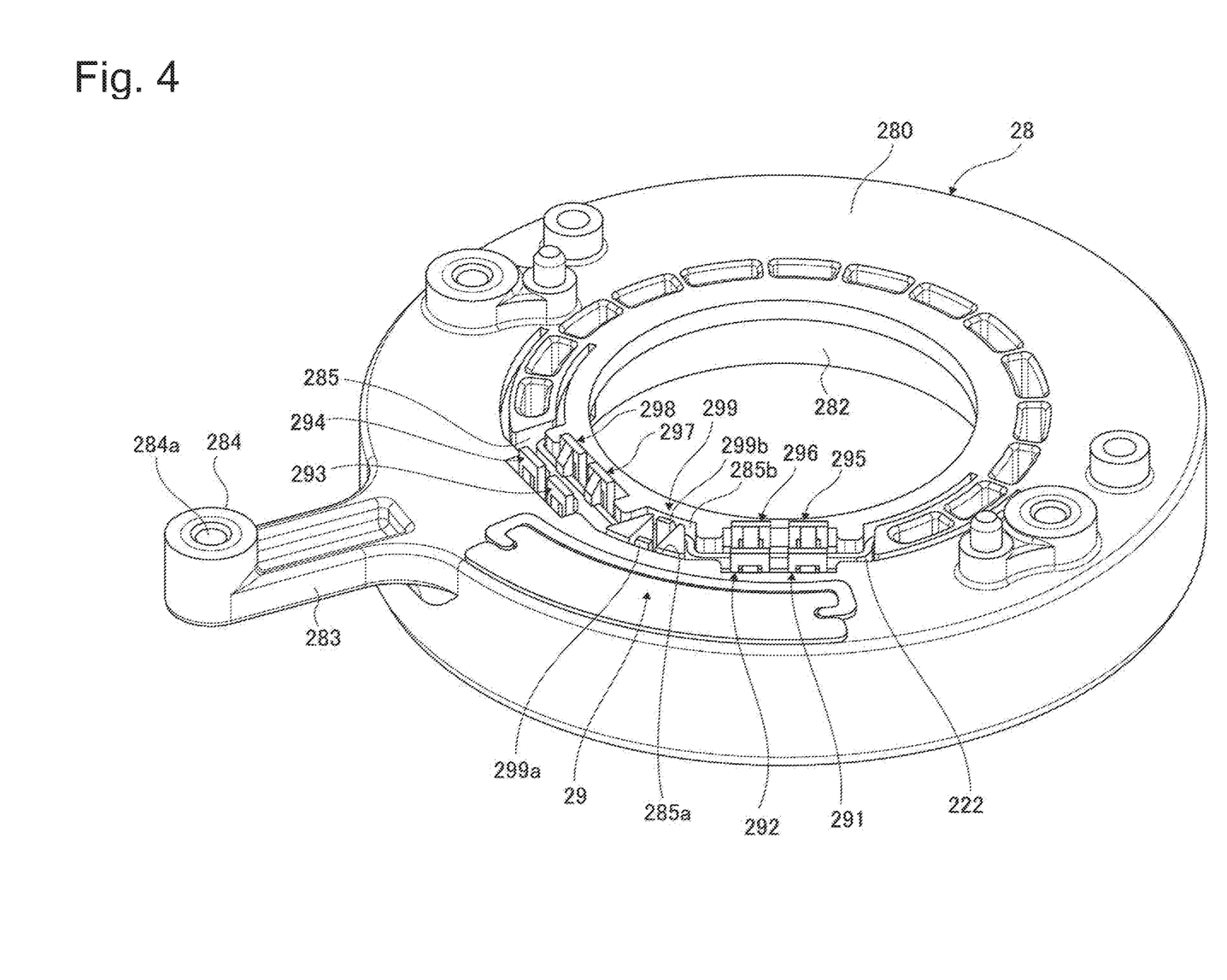
FIG. 4 is a perspective view of a magnetism-collecting-member retaining member 28 according to the Embodiment 1.

FIG. 4 is a perspective view of the magnetism-collecting-member retaining member 28 according to the Embodiment 1.

The magnetism-collecting-member retaining member 28 has an outer shape generally formed into a bottomed cup. The magnetism-collecting-member retaining member 28 includes an opening portion 282 at a center of a bottom portion 28a. The input shaft 5 extends through the opening portion 282. A flange portion 283 is protruding from an outer circumferential surface of the magnetism-collecting-member retaining member 28 in the radially outward direction. A column portion 284 is formed at a distal end of the flange portion 283. The flange portion 283 is subjected to lightening. A bolt hole 284a is formed in the column portion 284. A bolt, not shown, is used to fix the magnetism collecting unit 27 to the steering gear box 15 and inserted in the bolt hole 284a. Formed in the bottom portion 28 is a magnetism-collecting-member receiving groove 285. The first magnetism collecting member 221 and the second magnetism collecting member 222 are received by the magnetism-collecting-member receiving groove 285. The magnetism-collecting-member receiving groove 285 is formed along the shape of the first magnetism collecting member 221 and of the second magnetism collecting member 222. The magnetism-collecting-member receiving groove 285 has circumferential ends that are forked correspondingly to the first and second end portions 221a and 221b of the first magnetism collecting member 221 and the first and second end portions 222a and 222b of the second magnetism collecting member 222.

The magnetism-collecting-member retaining member 28 includes a retaining portion 29 for retaining the first magnetism collecting member 221 and the second magnetism collecting member 222 within the magnetism-collecting-member receiving groove 285. The retaining portion 29 is axially protruding from a bottom portion of the magnetism-collecting-member receiving groove 285. The retaining portion 29 includes eight magnetism-collecting-member retaining portions 291 to 298 and a biasing portion 299. The eight magnetism-collecting-member retaining portions 291 to 298 include four first magnetism-collecting-member retaining portions 291 to 294 and four second magnetism-collecting-member retaining portions 295 to 298. The four first magnetism-collecting-member retaining portions 291 to 294 are located radially outside the first magnetism collecting member 221 in such positions as to retain the first straight portions 221d and 221e. The four first magnetism-collecting-member retaining portions 291 to 294 limit a relative axial movement of the first magnetism collecting member 221 with respect to the magnetism-collecting-member retaining member 28. The four second magnetism-collecting-member retaining portions 295 to 298 are located radially inside the second magnetism collecting member 222 in such positions as to retain the second straight portions 222d and 222e. The four second magnetism-collecting-member retaining portions 295 to 298 limit a relative axial movement of the second magnetism collecting member 222 with respect to the magnetism-collecting-member retaining member 28. The first magnetism-collecting-member retaining portions 291 and 292 are circumferentially juxtaposed to each other in parallel with the first straight portion 221d. The second magnetism-collecting-member retaining portions 295 and 296 are circumferentially juxtaposed to each other in parallel with the second straight portion 222d. The second magnetism-collecting-member retaining portions 293 and 294 are circumferentially juxtaposed to each other in parallel with the second straight portion 221e. The second magnetism-collecting-member retaining portions 297 and 298 are circumferentially juxtaposed to each other in parallel with the second straight portion 222e.

The first magnetism-collecting-member retaining portions 291 and 292 are arranged symmetrically to the first magnetism-collecting-member retaining portions 293 and 294 with respect to the straight line L. The second magnetism-collecting-member retaining portions 295 and 296 are arranged symmetrically to the second magnetism-collecting-member retaining portions 297 and 298 with respect to the straight line L.

Figure 5:
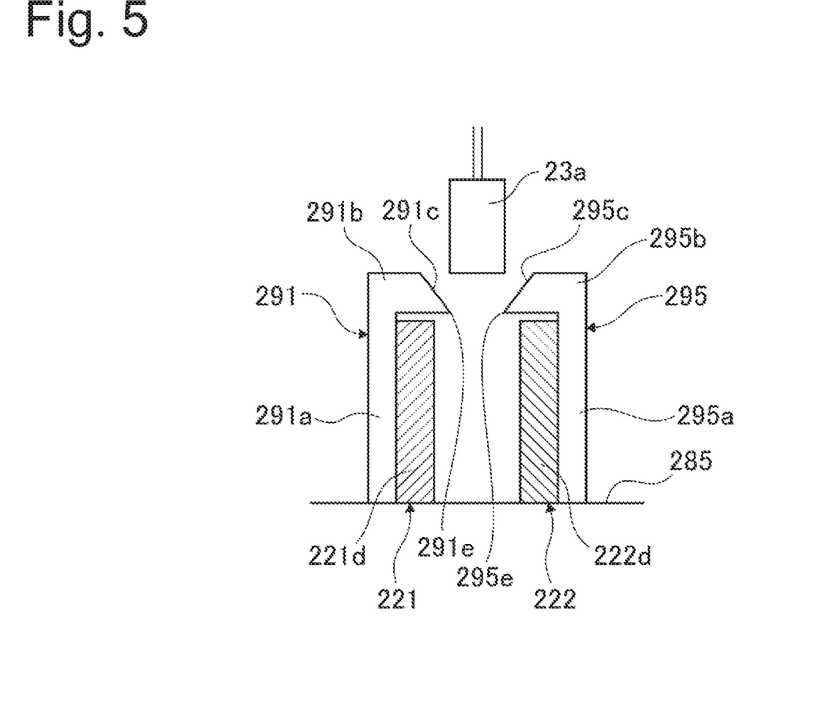
FIG. 5 is a cross-section view along line S5-S5 of FIG. 3.
Figure 6:
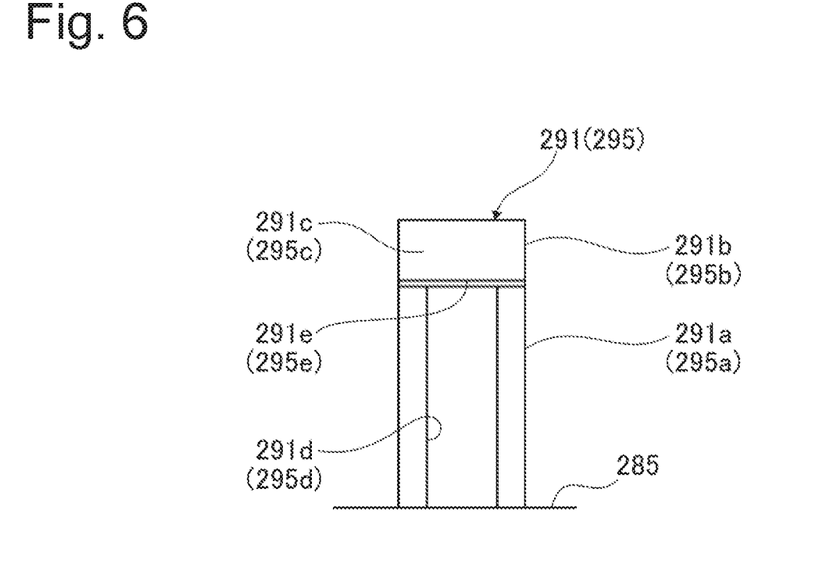
FIG. 6 shows a first magnetism-collecting-member retaining portion 291 (second magnetism-collecting-member retaining portion 295) as viewed from radially inside.

FIG. 5 is a cross-section view along line S5-S5 of FIG. 3. FIG. 6 shows a first magnetism-collecting-member retaining portion 291 (second magnetism-collecting-member retaining portion 295) as viewed from radially inside.

The first magnetism-collecting-member retaining portion 291 includes a first magnetism-collecting-member retaining portion body 291a and a first axial limiting portion 291b. The first magnetism-collecting-member retaining portion body 291a extends in the axial direction and is elastically deformable. As illustrated in FIG. 6, the first magnetism-collecting-member retaining portion body 291a includes a lightening recess 291d which opens in the radial direction. The first axial limiting portion 291b extends from a distal end of the first magnetism-collecting-member retaining portion body 291a in the radially inward direction and is axially opposed to an end surface of the first straight portion 221d. The first axial limiting portion 291b is provided with a first inclined surface 291c in a radially inner side thereof. The first inclined surface 291c is inclined relative to the axial direction so that a radial distance to the first Hall IC 23a decreases as the first inclined surface 291c axially approaches the first Hall IC 23a. The first axial limiting portion 291b includes a radially inner end portion 291e which is located radially further inside than the first straight portion 221d. There is an axial clearance (space) between the first axial limiting portion 291b and the first straight portion 221d.

As the other first magnetism-collecting-member retaining portions 292 to 294 have a similar shape to the first magnetism-collecting-member retaining portion 291, descriptions of the first magnetism-collecting-member retaining portions 292 to 294 will be omitted. The first magnetism-collecting-member retaining portion 292 is radially opposed to the second Hall IC 23b. The first magnetism-collecting-member retaining portion 293 is radially opposed to the third Hall IC 24a. The first magnetism-collecting-member retaining portion 294 is radially opposed to the fourth Hall IC 24b.

The second magnetism-collecting-member retaining portion 295 includes a second magnetism-collecting-member retaining portion body 295a and a second axial limiting portion 295b. The second magnetism-collecting-member retaining portion body 295a extends in the axial direction and is elastically deformable. As illustrated in FIG. 6, the second magnetism-collecting-member retaining portion body 295a includes a lightening recess 295d which opens in the radial direction. The second axial limiting portion 295b extends from a distal end of the second magnetism-collecting-member retaining portion body 295a in the radially outward direction and is axially opposed to an end surface of the second straight portion 222d. The second axial limiting portion 295b is provided with a second inclined surface 295c in a radially inner side thereof. The second inclined surface 295c is inclined relative to the axial direction so that a radial distance to the first Hall IC 23a decreases as the second inclined surface 295c axially approaches the first Hall IC 23a. The second axial limiting portion 295b includes a radially inner end portion 295e which is located radially further outside than the second straight portion 222d. There is an axial clearance (space) between the second axial limiting portion 295b and the second straight portion 222d.

As the other second magnetism-collecting-member retaining portions 296 to 298 have a similar shape to the second magnetism-collecting-member retaining portion 295, descriptions of the second magnetism-collecting-member retaining portions 296 to 298 will be omitted. The second magnetism-collecting-member retaining portion 296 is radially opposed to the second Hall IC 23b. The second magnetism-collecting-member retaining portion 297 is radially opposed to the third Hall IC 24a. The second magnetism-collecting-member retaining portion 298 is radially opposed to the fourth Hall IC 24b.

The biasing portion 299 is disposed in a radial space between the first magnetism collecting member 221 and the second magnetism collecting member 222. The biasing portion 299 includes a first biasing portion 299a and a second biasing portion 299b. The first biasing portion 299a and the second biasing portion 299b are disposed on the straight line L. The first biasing portion 299a biases the first magnetism collecting member 221 in the radially outward direction, whereas the second biasing portion 299b biases the second magnetism collecting member 222 in the radially inward direction. In other words, the biasing portion 299 biases the first and second magnetism collecting members 221 and 222 in such a direction that the first and second magnetism collecting members 221 and 222 move away from the first and second magnetic sensors 23 and 24. The first magnetism collecting member 221 biased radially outwards by the first biasing portion 299a receives reaction forces from two points A and B on a wall surface 285a located radially outside the magnetism-collecting-member receiving groove 285. In short, the biasing portion 299 biases the first magnetism collecting member 221 at three points (first biasing portion 299a and points A and B) which are spaced from one another. On the other hand, the second magnetism collecting member 222 biased radially inwards by the second biasing portion 299b receives reaction forces from two points C and D on a wall surface 285b located radially outside the magnetism-collecting-member receiving groove 285. That is, the biasing portion 299 biases the second magnetism collecting member 222 at three points (second biasing portion 299b and points C and D) which are spaced from one another.

Operation and advantageous effects of the Embodiment 1 will be discussed below.

The Embodiment 1 provides the two magnetic sensors (first magnetic sensor 23 and second magnetic sensor 24). The magnetic sensors 23 and 24 each include the two Hall ICs (first Hall ICs 23a and 24a, and second Hall ICs 23b and 24b). The electric power steering system of the Embodiment 1 uses the four magnetic sensors to detect the steering torque. It is therefore possible to identify in which one of the Hall ICs 23a, 23b, 24a and 24b an abnormality occurs. It is also possible to use the normal Hall ICs to continue assist control by the electric power steering system.

According to the Embodiment 1, the first magnetism collecting member 221 and the second magnetism collecting member 222 are fixed to the magnetism-collecting-member retaining member 28 in a snap-fit manner. This eliminates a need for a special process or equipment for welding, thermal caulking, etc., and reduces costs for equipment investment and the like. On the other hand, since the first magnetism collecting member 221 and the second magnetism collecting member 222 are retained by the retaining portion 29, there is a chance that inner stress is created and affects magnetic field detection properties.

To solve this problem, according to the Embodiment 1, the retaining portion 29 is disposed in such a position in the first and second magnetism collecting members 221 and 222 as to be magnetically symmetrical with respect to the first and second magnetic sensors 23 and 24. The retaining portion 29 therefore affects the first magnetic sensor 23 and the second magnetic sensor 24 equally. This equalizes the detection properties of the first and second magnetic sensors 23 and 24 and also further curbs the influence of the retaining portion 29 on portions of the first and second magnetism collecting members 221 and 222, which are located on the end portions 221a, 221b, 222a and 222b side of the first and second magnetic sensors 23 and 24. Consequently, the electric motor 3 is properly controlled.

According to the Embodiment 1, the retaining portion 29 includes the first magnetism-collecting-member retaining portions 291 to 294 and the second magnetism-collecting-member retaining portions 295 to 298 which retain the first strait portions 221d and 221e of the first magnetism collecting member 221 and the second straight portions 222d and 222e of the second magnetism collecting member 222. Therefore, the portions opposed to the first and second magnetism collecting members 221 and 222 of the retaining portion 29 can be formed into a flat plate-like shape as opposed to an arch-like shape. The flat plate-like shape, as compared to the arch-like shape, makes it easier to bend the first and second magnetism collecting members 221 and 222 at the time of assembly, which improves assemblability.

According to the Embodiment 1, the first magnetic sensor 23 is disposed between the first straight portion 221d and the second straight portion 222d, and the second magnetic sensor 24 between the first straight portion 221e and the second straight portion 222e. Formed in a linear shape, the first straight portions 221d and 221e and the second straight portions 222d and 222e can approach each other, respectively. The first and second magnetic sensors 23 and 24 are thus improved in detection accuracy. Since the retaining portion 29 is disposed at the first straight portions 221d and 221e and the second straight portions 222d and 222e, the first straight portions 221d and 221e and the second straight portions 222d and 222e provide two advantageous effects including an improvement in detection accuracy and an improvement in flexibility of the retaining portion 29.

First axial limiting portions 291b to 294b and second axial limiting portions 295b to 298b include first inclined surfaces 291c to 294c and second inclined surfaces 295c to 298c, respectively. When the Hall ICs 23a and 23b of the first magnetic sensor 23 are to be axially inserted between the first straight portion 221d and the second straight portion 222d, and the Hall ICs 24a and 24b of the second magnetic sensor 24 are to be axially inserted between the first straight portion 221e and the second straight portion 222e, the first inclined surfaces 291c to 294c and the second inclined surfaces 295c to 298c have such a shape as to guide the Hall ICs 23a, 23b, 24a and 24b into therebetween. This improves insertability of the Hall ICs 23a, 23b, 24a and 24b while preventing interference of the Hall ICs 23a, 23b, 24a and 24b with the first straight portions 221d and 221e and the second straight portions 222d and 222e.

The first magnetism collecting member 221 is located radially further outside than radially inner end portions 291e to 294e of the first axial limiting portions 291b to 294b. The second magnetism collecting member 222 is located radially further outside than radially outer end portions 295e to 298e of the second axial limiting portions 295b to 298b. This prevents the Hall ICs 23a, 23b, 24a and 24b from coming into contact with the first magnetism collecting member 221 and the second magnetism collecting member 222.

The first magnetism-collecting-member retaining portion 291 and the second magnetism-collecting-member retaining portion 295 are opposed to the first Hall IC 23a. The first magnetism-collecting-member retaining portion 292 and the second magnetism-collecting-member retaining portion 296 are opposed to the second Hall IC 23b. The first magnetism-collecting-member retaining portion 293 and the second magnetism-collecting-member retaining portion 297 are opposed to the third Hall IC 24a. The first magnetism-collecting-member retaining portion 294 and the second magnetism-collecting-member retaining portion 298 are opposed to the fourth Hall IC 24a. In short, the magnetism collecting member's bodies 291 to 298 are provided to the Hall ICs 23a, 23b, 24a and 24b, which reduces the rigidity of each component, as compared to when the magnetism collecting member's bodies 291 to 298 are formed integrally with the Hall ICs 23a, 23b, 24a and 24b. Consequently, the first magnetism collecting member 221 and the second magnetism collecting member 222 are improved in insertability.

First magnetism-collecting-member retaining portion's bodies 291a to 294a and second magnetism-collecting-member retaining portion's bodies 295a to 298a include lightening recesses 291d to 298d which open in the radial direction. The lightening recesses 291d to 298d reduce the rigidity of the first magnetism-collecting-member retaining portion's bodies 291a to 294a and the second magnetism-collecting-member retaining portion's bodies 295a to 298a, and also improve the insertability of the first magnetism collecting member 221 and the second magnetism collecting member 222.

There is an axial clearance between the first axial limiting portions 291b and 292b and the first straight portion 221d, and there is an axial clearance between the first axial limiting portions 293b and 294b and the first straight portion 221e. There is an axial clearance between the second axial limiting portions 295b and 296b and the second straight portion 222d, and there is an axial clearance between the second axial limiting portions 297b and 298b and the second straight portion 222e. These clearances prevent the inner stress of the first and second magnetism collecting members 221 and 222 from being generated, and also improve the detection accuracy of the first and second magnetic sensors 23 and 24.

The biasing portion 299 biases the first magnetism collecting member 221 and the second magnetism collecting member 222 in a through-thickness direction of the first and second magnetism collecting members 221 and 222. The through-thickness direction of the first and second magnetism collecting members 221 and 222 is a direction of a magnetic flux. The clearance between the first and second magnetism collecting members 221 and 222, which extend in the direction of the magnetic flux, has importance for accuracy in detection of magnetism. Biasing the first magnetism collecting member 221 and the second magnetism collecting member 222 in the through-thickness direction stabilizes the clearance extending in the through-thickness direction and improves the detection accuracy.

The biasing portion 299 is disposed in a radial space between the first magnetism collecting member 221 and the second magnetism collecting member 222. The biasing portion 299 as a single component can bias both the first magnetism collecting member 221 and the second magnetism collecting member 222, which prevents an increase in the number of components.

The biasing portion 299 biases the first magnetism collecting member 221 and the second magnetism collecting member 222 in a direction away from the Hall ICs 23a, 23b, 24a and 24b. Thus, the clearance between the Hall ICs 23a and 23b and the first magnetism collecting member 221, and the clearance between the Hall ICs 24a and 24b and the second magnetism collecting member 222 are stably and properly maintained.

The biasing portion 299 biases the first magnetism collecting member 221 and the second magnetism collecting member 222 at three points which are spaced from one another. The first magnetism collecting member 221 and the second magnetism collecting member 222 are thus biased in a stable manner.

Other Embodiments

The embodiments for carrying out the invention have been discussed. The specific constitution of the invention is not limited to those of the embodiments, and all design modifications and the like made without deviating from the gist of the invention are intended to be included in the invention.

The retaining portion 29 may be disposed in such positions in the first and second magnetism collecting members 221 and 222 as to be magnetically symmetrical to each other with respect to the first and second magnetic sensors 23 and 24 and disposed to retain the first end portion 221a of the first magnetism collecting member 221, the second end portion 221b of the first magnetism collecting member 221, the first end portion 222a of the second magnetism collecting member 222, and the second end portion 222b of the second magnetism collecting member 222. This way, the first magnetic sensor 23 and the second magnetic sensor 24 are disposed in the first and second magnetism collecting members 221 and 222 at positions away from portions affected by the retaining portion 29, resulting in improvement of the detection accuracy. Moreover, since the retaining portion 29 is disposed in such positions as to be magnetically symmetrical to each other with respect to the first and second magnetic sensors 23 and 24, it is possible to suppress a detection property fluctuation between the first and second magnetic sensors 23 and 24.

Other aspects which can be understood from the foregoing embodiments will be discussed below.

A torque sensor, according to one aspect thereof, includes a rotary member including a first shaft and a second shaft connected together through a torsion bar; a magnet disposed at the first shaft so as to rotate along with rotation of the first shaft, and having N and S poles alternately arranged in a direction around a rotation axis of the rotary member; a first yoke member disposed at the second shaft so as to rotate along with rotation of the second shaft and made of magnetic material, the first yoke member including first claw portions which are a plurality of sheet-like members opposed to the magnetic member, and a first ring portion formed into a circular ring and connecting the first claw portions; a second yoke member disposed at the second shaft so as to rotate along with rotation of the second shaft and made of magnetic material, the second yoke member including second claw portions which are a plurality of sheet-like members opposed to the magnetic member, and a second ring portion formed into a circular ring and connecting the second claw portions, the second claw portions being arranged alternately with the first claw portions;

a first magnetism collecting member made of magnetic material, and including a first arch-shaped portion extending along the direction around the rotation axis, the first arch-shaped portion being opposed to and located away from the first ring portion, the first magnetism collecting member further including a pair of end portions which are a first end portion of the first magnetism collecting member and a second end portion of the first magnetism collecting member, a second magnetism collecting member made of magnetic material, and including a second arch-shaped portion extending along the direction around the rotation axis, the second arch-shaped portion being opposed to and located away from the second ring portion, the second magnetism collecting member further including a pair of end portions which are a first end portion of the second magnetism collecting member and a second end portion of the second magnetism collecting member; a first magnetic sensor disposed between the first magnetism collecting member and the second magnetism collecting member, and including a detection element configured to detect a change in a magnetic field between the first magnetism collecting member and the second magnetism collecting member; a second magnetic sensor disposed between the first magnetism collecting member and the second magnetism collecting member, and including a detection element configured to detect a change in a magnetic field between the first magnetism collecting member and the second magnetism collecting member; and a magnetism-collecting-member retaining member made of non-magnetic material and configured to retain the first magnetism collecting member and the second magnetism collecting member, the magnetism-collecting-member retaining member including a retaining portion configured to retain the first magnetism collecting member and the second magnetism collecting member, the magnetism-collecting-member retaining member being disposed at the first magnetism collecting member and the second magnetism collecting member in the direction around the rotation axis in such a position as to be magnetically symmetrical with respect to the first magnetic sensor and the second magnetic sensor or disposed to retain the first end portion of the first magnetism collecting member, the second end portion of the first magnetism collecting member, the first end portion of the second magnetism collecting member, and the second end portion of the second magnetism collecting member, the torque sensor is configured to detect torque generated in the rotary member, based on output signals of the first magnetic sensor and the second magnetic sensor.

In a more preferable aspect according to the foregoing aspect, the retaining portion is disposed in a position between the first magnetic sensor and the second magnetic sensor in the direction around the rotation axis, the position being magnetically symmetrical with respect to the first magnetic sensor and the second magnetic sensor.

In another preferable aspect according to either one of the foregoing aspects, the first magnetism collecting member includes a first straight portion, which is linearly formed along a direction of a tangent to the direction around the rotation axis. The second magnetism collecting member includes a second straight portion, which is linearly formed along a direction of a tangent to the direction around the rotation axis. The retaining portion includes a first magnetism-collecting-member retaining portion disposed in such a position as to retain the first straight portion and configured to limit a relative movement of the first magnetism collecting member with respect to the magnetism-collecting-member retaining member, and a second magnetism-collecting-member retaining portion disposed in such a position as to retain the second straight portion and configured to limit a relative movement of the second magnetism collecting member. The first magnetism-collecting-member retaining portion includes a first magnetism-collecting-member retaining portion body which extends in a rotation-axis direction of the rotary member and is elastically deformable, and a first axial limiting portion disposed at the first magnetism-collecting-member retaining portion body, opposed to an end surface of the first straight portion, which is located on one side in the rotation-axis direction, and configured to limit a relative movement of the first magnetism collecting member in the rotation-axis direction with respect to the magnetism-collecting-member retaining member. The second magnetism-collecting-member retaining portion includes a second magnetism-collecting-member retaining portion body which extends in the rotation-axis direction and is elastically deformable, and a second axial limiting portion disposed at the second magnetism-collecting-member retaining portion body, opposed to an end surface of the second straight portion, which is located on one side in the rotation-axis direction, and configured to limit a relative movement of the second magnetism collecting member in the rotation-axis direction with respect to the magnetism-collecting-member retaining member.

In still another preferable aspect according to any one of the foregoing aspects, the first magnetic sensor and the second magnetic sensor are disposed between the first straight portion and the second straight portion.

In still another preferable aspect according to any one of the foregoing aspects, the first axial limiting portion includes a first inclined surface disposed on an opposite side to the first magnetism collecting member in the rotation-axis direction and inclined relative to the rotation axis. The first inclined surface is so formed that a distance of the first inclined surface to the first magnetic sensor and the second magnetic sensor in a radial direction relative to the rotation axis decreases as the first inclined surface approaches the first magnetic sensor and the second magnetic sensor in the rotation-axis direction. The second axial limiting portion includes a second inclined surface disposed on an opposite side to the second magnetism collecting member in the rotation-axis direction and inclined relative to the rotation axis. The second inclined surface is so formed that a distance of the second inclined surface to the first magnetic sensor and the second magnetic sensor in the radial direction relative to the rotation axis decreases as the second inclined surface approaches the first magnetic sensor and the second magnetic sensor in the rotation-axis direction.

In still another preferable aspect according to any one of the foregoing aspects, the first magnetism collecting member is disposed on an outer side of the second magnetism collecting member in the radial direction relative to the rotation axis; the first magnetism-collecting-member retaining portion body is disposed on a radially opposite side of the first straight portion relative to the first magnetic sensor and the second magnetic sensor; the second magnetism collecting member body is disposed on a radially opposite side of the second straight portion relative to the first magnetic sensor and the second magnetic sensor; the first axial limiting portion includes a radially inner end portion which is located radially further inside than the first magnetic sensor and the second magnetic sensor; and the second axial limiting portion includes a radially outer end portion which is located radially further outside than the first magnetic sensor and the second magnetic sensor.

In still another preferable aspect according to any one of the foregoing aspects, the first magnetism collecting member is disposed on an outer side of the second magnetism collecting member in the radial direction relative to the rotation axis; the first magnetism-collecting-member retaining portion body includes a first magnetism-collecting-member retaining portion body for a first magnetic sensor and a first magnetism-collecting-member retaining portion body for a second magnetic sensor, which are disposed on a radially opposite side of the first straight portion relative to the first magnetic sensor and the second magnetic sensor, and juxtaposed with each other in a direction around the rotation axis; the first magnetism-collecting-member retaining portion body for the first magnetic sensor is radially opposed to the first magnetic sensor, the first magnetism-collecting-member retaining portion body for the second magnetic sensor is radially opposed to the second magnetic sensor; the second magnetism-collecting-member retaining portion body includes a second magnetism-collecting-member retaining portion body for a first magnetic sensor and a second magnetism-collecting-member retaining portion body for a second magnetic sensor disposed on a radially opposite side of the second straight portion relative to the first magnetic sensor and the second magnetic sensor, and juxtaposed with each other in the direction around the rotation axis; the second magnetism-collecting-member retaining portion body for first magnetic sensor is radially opposed to the first magnetic sensor; and the second magnetism-collecting-member retaining portion body for the second magnetic sensor is radially opposed to the second magnetic sensor.

In still another preferable aspect according to any one of the foregoing aspects, the first magnetism-collecting-member retaining portion body and the second magnetism-collecting-member retaining portion body each include a lightening recess which opens in the radial direction relative to the rotation axis.

In still another preferable aspect according to any one of the foregoing aspects, the first axial limiting portion is disposed so that there is a clearance between the first straight portion and the first axial limiting portion in the rotation-axis direction; and the second axial limiting portion is disposed so that there is a clearance between the second straight portion and the second axial limiting portion in the rotation-axis direction.

In still another preferable aspect according to any one of the foregoing aspects, each of the first magnetism collecting member and the second magnetism collecting member is formed by bending metal sheet material made of magnetic material; and the retaining portion includes a biasing portion configured to bias the first magnetism collecting member and the second magnetism collecting member in a through-thickness direction of the metal sheet material.

In still another preferable aspect according to any one of the foregoing aspects, the biasing portion is disposed between the first magnetism collecting member and the second magnetism collecting member.

In still another preferable aspect according to any one of the foregoing aspects, the biasing portion is configured to bias each of the first magnetism collecting member and the second magnetism collecting member in a direction away from the first magnetic sensor and the second magnetic sensor.

In still another preferable aspect according to any one of the foregoing aspects, the biasing portion is configured to bias each of the first magnetism collecting member and the second magnetism collecting member at three points which are spaced from one another.

In still another preferable aspect according to any one of the foregoing aspects, the retaining portion is disposed at the first magnetism collecting member and the second magnetism collecting member in the direction around the rotation axis in such a position as to be magnetically symmetrical with respect to the first magnetic sensor and the second magnetic sensor and disposed to retain the first end portion of the first magnetism collecting member, the second end portion of the first magnetism collecting member, the first end portion of the second magnetism collecting member, and the second end portion of the second magnetism collecting member.

In still another preferable aspect according to any one of the foregoing aspects, the first magnetism collecting member includes a first straight portion, which is linearly formed along a direction of a tangent to the direction around the rotation axis; the second magnetism collecting member includes a second straight portion, which is linearly formed along a direction of a tangent to the direction around the rotation axis; the retaining portion includes a first magnetism-collecting-member retaining portion disposed in such a position as to retain the first straight portion and configured to limit a relative movement of the first magnetism collecting member with respect to the magnetism-collecting-member retaining member, and a second magnetism-collecting-member retaining portion disposed in such a position as to retain the second straight portion and configured to limit a movement of the second magnetism collecting member; the first magnetism-collecting-member retaining portion includes the first magnetism-collecting-member retaining portion body which extends in the rotation-axis direction of the rotary member and is elastically deformable, and the first axial limiting portion disposed at the first magnetism-collecting-member retaining portion body, opposed to the end surface of the first straight portion, which is located on one side in the rotation-axis direction, and configured to limit a relative movement of the first magnetism collecting member with respect to the magnetism-collecting-member retaining member in the rotation-axis direction; and the second magnetism-collecting-member retaining portion includes the second magnetism-collecting-member retaining portion body which extends in the rotation-axis direction and is elastically deformable, and the second axial limiting portion disposed at the second magnetism-collecting-member retaining portion body, opposed to the end surface of the second straight portion, which is located on one side in the rotation-axis direction, and configured to limit a relative movement of the second magnetism collecting member with respect to the magnetism-collecting-member retaining member in the rotation-axis direction.

From another view point, an electric power steering system according to one aspect includes a steering shaft rotated along with rotation of a steering wheel, the steering shaft including a first shaft and a second shaft which are connected together through a torsion bar; a steering mechanism including a transmission mechanism configured to transmit the rotation of the steering shaft to a steered wheel; an electric motor configured to impart a steering force to the steering mechanism; a torque sensor configured to detect steering torque of the steering mechanism; and a control device configured to drive-control the electric motor on the basis of the steering torque. The torque sensor includes a magnet disposed at the first shaft so as to rotate along with rotation of the first shaft, and having N and S poles alternately arranged in a direction around a rotation axis of the steering shaft; a first yoke member disposed at the second shaft so as to rotate along with rotation of the second shaft and made of magnetic material, the first yoke member including first claw portions which are a plurality of sheet-like members opposed to the magnetic member, and a first ring portion formed into a circular ring and connecting the first claw portions; a second yoke member disposed at the second shaft so as to rotate along with rotation of the second shaft and made of magnetic material, the second yoke member including second claw portions which are a plurality of sheet-like members opposed to the magnetic member, and a second ring portion formed into a circular ring and connecting the second claw portions, the second claw portions being arranged alternately with the first claw portions; a first magnetism collecting member made of magnetic material, and including a first arch-shaped portion extending along the direction around the rotation axis, the first arch-shaped portion being opposed to and located away from the first ring portion, the first magnetism collecting member further including a pair of end portions which are a first end portion of the first magnetism collecting member and a second end portion of the first magnetism collecting member; a second magnetism collecting member made of magnetic material, and including a second arch-shaped portion extending along the direction around the rotation axis, the second arch-shaped portion being opposed to and located away from the second ring portion, the second magnetism collecting member further including a pair of end portions which are a first end portion of the second magnetism collecting member and a second end portion of the second magnetism collecting member; a first magnetic sensor disposed between the first magnetism collecting member and the second magnetism collecting member and including a detection element configured to detect a change in a magnetic field between the first magnetism collecting member and the second magnetism collecting member; a second magnetic sensor disposed between the first magnetism collecting member and the second magnetism collecting member and including a detection element configured to detect a change in a magnetic field between the first magnetism collecting member and the second magnetism collecting member; and a magnetism-collecting-member retaining member made of non-magnetic material and configured to retain the first magnetism collecting member and the second magnetism collecting member, the magnetism-collecting-member retaining member including a retaining portion configured to retain the first magnetism collecting member and the second magnetism collecting member, the retaining portion being disposed at the first magnetism collecting member and the second magnetism collecting member in the direction around the rotation axis in such a position as to be magnetically symmetrical with respect to the first magnetic sensor and the second magnetic sensor or disposed to retain the first end portion of the first magnetism collecting member, the second end portion of the first magnetism collecting member, the first end portion of the second magnetism collecting member, and the second end portion of the second magnetism collecting member, the torque sensor is configured to detect torque generated in the rotary member, based on output signals of the first magnetic sensor and the second magnetic sensor.

The embodiments of the invention have been described on the basis of several exemplary embodiments. The above-mentioned embodiments of the invention are not intended to limit the invention but to facilitate the understanding of the invention. The invention may be modified or improved without deviating from the gist thereof, and includes equivalents thereto. The elements mentioned in the claims and the specification may be arbitrarily combined or omitted as long as at least a part of the above-mentioned problem is solved or at least a part of the advantageous effects is produced.

The present application claims priority to Japanese Patent Application No. 2016-185110 filed on Sep. 23, 2016. The entire disclosure of Japanese Patent Application No. 2016-185110 filed on Sep. 23, 2016, including the specification, the claims, the drawings and the abstract, is incorporated herein by reference in its entirety.

REFERENCE SIGN LIST

1: Electric power steering system
2: Steering wheel
3: Electric motor
5: Input shaft (second shaft)
6: Torsion bar
7: Pinion shaft (first shaft)
13: Torque sensor
16: Rotary member
17: Steering mechanism
20: Magnet
211: First yoke member
212: Second yoke member
221: First magnetism collecting member
222: Second magnetism collecting member
22: Magnetism collecting member
23: First magnetic sensor (first magnetic sensor)
24: Second magnetic sensor (second magnetic sensor)
28: Magnetism-collecting-member retaining member
29: Retaining portion

The invention claimed is:

1. A torque sensor comprising:
a rotary member including a first shaft and a second shaft connected together through a torsion bar;
a magnet disposed at the first shaft so as to rotate along with rotation of the first shaft, and having N and S poles alternately arranged in a direction around a rotation axis of the rotary member;
a first yoke member disposed at the second shaft so as to rotate along with rotation of the second shaft and made of magnetic material, the first yoke member including first claw portions which are a plurality of magnetic sheets opposed to the magnet, and a first ring portion formed into a circular ring and connecting the first claw portions;
a second yoke member disposed at the second shaft so as to rotate along with rotation of the second shaft and made of magnetic material, the second yoke member including second claw portions which are a plurality of magnetic sheets opposed to the magnet, and a second ring portion formed into a circular ring and connecting the second claw portions, the second claw portions being arranged alternately with the first claw portions;
a first magnetism collecting member made of magnetic material, and including a first arch-shaped portion extending along the direction around the rotation axis, and a pair of end portions which are a first end portion and a second end portion, the first arch-shaped portion being opposed to and located away from the first ring portion;
a second magnetism collecting member made of magnetic material, and including a second arch-shaped portion extending along the direction around the rotation axis, and a pair of end portions which are a first end portion and a second end portion, the second arch-shaped portion being opposed to and located away from the second ring portion;

a first magnetic sensor disposed between the first magnetism collecting member and the second magnetism collecting member, and including a detection element configured to detect a change in a magnetic field between the first magnetism collecting member and the second magnetism collecting member;

a second magnetic sensor disposed between the first magnetism collecting member and the second magnetism collecting member, and including a detection element configured to detect a change in a magnetic field between the first magnetism collecting member and the second magnetism collecting member; and a retaining portion including a magnetism-collecting-member retaining member made of non-magnetic material and configured to retain the first magnetism collecting member and the second magnetism collecting member, wherein the retaining portion is
  disposed at the first magnetism collecting member and the second magnetism collecting member in the direction around the rotation axis in such a position that the first magnetic sensor and the second magnetic sensor are arranged with magnetic symmetry by aligning the magnetic sensor with the first and second claw portions, or
  disposed to retain the first end portion of the first magnetism collecting member, the second end portion of the first magnetism collecting member, the first end portion of the second magnetism collecting member, and the second end portion of the second magnetism collecting member, the torque sensor is configured to detect torque generated in the rotary member, based on output signals of the first magnetic sensor and the second magnetic sensor the first magnetism collecting member includes a first straight portion which is linearly formed along a direction of a tangent to the direction around the rotation axis, the second magnetism collecting member includes a second straight portion which is linearly formed along a direction of a tangent to the direction around the rotation axis, the retaining portion includes:
a first magnetism-collecting-member retaining portion disposed in such a position as to retain the first straight portion and configured to limit a relative movement of the first magnetism collecting member with respect to the magnetism-collecting-member retaining member; and a second magnetism-collecting-member retaining portion disposed in such a position as to retain the second straight portion and configured to limit a relative movement of the second magnetism collecting member, the first magnetism-collecting-member retaining portion includes:
a first magnetism-collecting-member retaining portion body which extends in a rotation-axis direction of the rotary member and is elastically deformable; and a first axial limiting portion disposed at the first magnetism-collecting-member retaining portion body, opposed to an end surface of the first straight portion, the end surface being located on one side in the rotation-axis direction, the first axial limiting portion being configured to limit a relative movement of the first magnetism collecting member in the rotation-axis direction with respect to the magnetism-collecting-member retaining member, and the second magnetism-collecting-member retaining portion includes:
a second magnetism-collecting-member retaining portion body which extends in the rotation-axis direction and is elastically deformable; and a second axial limiting portion disposed at the second magnetism-collecting-member retaining portion body, opposed to an end surface of the second straight portion, the end surface being located on one side in the rotation-axis direction, the second axial limiting portion being configured to limit a relative movement of the second magnetism collecting member in the rotation-axis direction with respect to the magnetism-collecting-member retaining member.

2. The torque sensor of claim 1, wherein the retaining portion is disposed in a position between the first magnetic sensor and the second magnetic sensor in the direction around the rotation axis, the first magnetic sensor and the second magnetic sensor are positioned symmetrically relative to the yoke members.

3. The torque sensor of claim 1,
wherein the first magnetic sensor and the second magnetic sensor are disposed between the first straight portion and the second straight portion.

4. The torque sensor of claim 3,
wherein the first axial limiting portion includes a first inclined surface disposed on an opposite side to the first magnetism collecting member in the rotation-axis direction and inclined relative to the rotation axis, the first inclined surface is so formed that a distance of the first inclined surface to the first magnetic sensor and the second magnetic sensor in a radial direction relative to the rotation axis decreases as the first inclined surface approaches the first magnetic sensor and the second magnetic sensor in the rotation-axis direction, the second axial limiting portion includes a second inclined surface disposed on an opposite side to the second magnetism collecting member in the rotation-axis direction and inclined relative to the rotation axis, and the second inclined surface is so formed that a distance of the second inclined surface to the first magnetic sensor and the second magnetic sensor in the radial direction relative to the rotation axis decreases as the second inclined surface approaches the first magnetic sensor and the second magnetic sensor in the rotation-axis direction.

5. The torque sensor of claim 4,
wherein the first magnetism collecting member is disposed on an outer side of the second magnetism collecting member in the radial direction relative to the rotation axis, the first magnetism-collecting-member retaining portion body is disposed on a radially opposite side of the first straight portion relative to the first magnetic sensor and the second magnetic sensor, the second magnetism collecting member body is disposed on a radially opposite side of the second straight portion relative to the first magnetic sensor and the second magnetic sensor, the first axial limiting portion includes a radially inner end portion located radially further inside than the first magnetic sensor and the second magnetic sensor, and the second axial limiting portion includes a radially outer end portion located radially further outside than the first magnetic sensor and the second magnetic sensor.

6. The torque sensor of claim 4, wherein the first magnetism collecting member is disposed on an outer side of the second magnetism collecting member in the radial direction relative to the rotation axis, the first magnetism-collecting-member retaining portion body includes a first magnetism-collecting-member retaining portion body for a first magnetic sensor and a first magnetism-collecting-member retaining portion body for a second magnetic sensor, which are respectively disposed on a radially opposite side of the first straight portion relative to the first magnetic sensor and the second magnetic sensor, and juxtaposed with each other in a direction around the rotation axis, the first magnetism-collecting-member retaining portion body for the first magnetic sensor is radially opposed to the first magnetic sensor, the first magnetism-collecting-member retaining portion body for the second magnetic sensor is radially opposed to the second magnetic sensor, the second magnetism-collecting-member retaining portion body includes a second magnetism-collecting-member retaining portion body for a first magnetic sensor and a second magnetism-collecting-member retaining portion body for a second magnetic sensor, which are respectively disposed on a radially opposite side of the second straight portion relative to the first magnetic sensor and the second magnetic sensor, and juxtaposed with each other in the direction around the rotation axis, the second magnetism-collecting-member retaining portion body for the first magnetic sensor is radially opposed to the first magnetic sensor, and the second magnetism-collecting-member retaining portion body for the second magnetic sensor is radially opposed to the second magnetic sensor.

7. The torque sensor of claim 4, wherein the first magnetism-collecting-member retaining portion body and the second magnetism-collecting-member retaining portion body each include a lightening portion which opens in the radial direction relative to the rotation axis.

8. The torque sensor of claim 1, wherein the first axial limiting portion is disposed so that there is a clearance between the first axial limiting portion and the first straight portion in the rotation-axis direction, and the second axial limiting portion is disposed so that there is a clearance between the second axial limiting portion and the second straight portion in the rotation-axis direction.

9. The torque sensor of claim 1, wherein the first magnetism collecting member and the second magnetism collecting member are formed by bending metal sheet material made of magnetic material, and the retaining portion includes a biasing portion configured to bias the first magnetism collecting member and the second magnetism collecting member in a through-thickness direction of the metal sheet material wherein the biasing is a retention force to separate the first magnetism collecting member and the second magnetism collecting member.

10. The torque sensor of claim 9, wherein the biasing portion is disposed between the first magnetism collecting member and the second magnetism collecting member.

11. The torque sensor of claim 10, wherein the biasing portion is configured to bias the first magnetism collecting member and the second magnetism collecting member in a direction away from the first magnetic sensor and the second magnetic sensor.

12. The torque sensor of claim 11, wherein the biasing portion is configured to bias the first magnetism collecting member and the second magnetism collecting member at three points which are spaced from one another.

13. The torque sensor of claim 1, wherein the retaining portion is disposed at the first magnetism collecting member and the second magnetism collecting member in the direction around the rotation axis in such a position as to be magnetically symmetrical with respect to the first magnetic sensor and the second magnetic sensor, and disposed to retain the first end portion of the first magnetism collecting member, the second end portion of the first magnetism collecting member, the first end portion of the second magnetism collecting member, and the second end portion of the second magnetism collecting member.

14. A power steering system comprising:

a steering shaft rotated along with rotation of a steering wheel, and including a first shaft and a second shaft which are connected together through a torsion bar;

a steering mechanism including a transmission mechanism configured to transmit the rotation of the steering shaft to a steered wheel;

an electric motor configured to impart a steering force to the steering mechanism;

a torque sensor configured to detect steering torque of the steering mechanism; and a control device configured to drive-control the electric motor on the basis of the steering torque, wherein the torque sensor includes:

a magnet disposed at the first shaft so as to rotate along with rotation of the first shaft, and having N and S poles alternately arranged in a direction around a rotation axis of the steering shaft;

a first yoke member disposed at the second shaft so as to rotate along with rotation of the second shaft and made of magnetic material, the first yoke member including first claw portions which are a plurality of magnetic sheets opposed to the magnet, and a first ring portion formed into a circular ring and connecting the first claw portions;

a second yoke member disposed at the second shaft so as to rotate along with rotation of the second shaft and made of magnetic material, the second yoke member including second claw portions which are a plurality of magnetic sheets opposed to the magnet, and a second ring portion formed into a circular ring and connecting the second claw portions, the second claw portions being arranged alternately with the first claw portions;

a first magnetism collecting member made of magnetic material, and including a first arch-shaped portion extending along the direction around the rotation axis, and a pair of end portions which are a first end portion and a second end portion, the first arch-shaped portion being opposed to the first ring portion and located away from the first arch-shaped portion;

a second magnetism collecting member made of magnetic material, and including a second arch-shaped portion extending along the direction around the rotation axis, and a pair of end portions which are a first end portion and a second end portion, the second arch-shaped portion being opposed to the second ring portion and located away from the second arch-shaped portion;

a first magnetic sensor disposed between the first magnetism collecting member and the second magnetism collecting member, and including a detection element configured to detect a change in a magnetic field between the first magnetism collecting member and the second magnetism collecting member;

a second magnetic sensor disposed between the first magnetism collecting member and the second magnetism collecting member, and including a detection element configured to detect a change in a magnetic field between the first magnetism collecting member and the second magnetism collecting member; and a retaining portion including a magnetism-collecting-member retaining member made of non-magnetic material and configured to retain the first magnetism collecting member and the second magnetism collecting member, the magnetism-collecting-member retaining member is
  disposed at the first magnetism collecting member and the second magnetism collecting member in the direction around the rotation axis in such a position that the first magnetic sensor and the second magnetic sensor are arranged with magnetic symmetry by aligning the magnetic sensor with the first and second claw portions, or
  disposed to retain the first end portion of the first magnetism collecting member, the second end portion of the first magnetism collecting member, the first end portion of the second magnetism collecting member, and the second end portion of the second magnetism collecting member, the torque sensor is configured to detect torque generated in the rotary member, based on output signals of the first magnetic sensor and the second magnetic sensor, the first magnetism collecting member includes a first straight portion which is linearly formed along a direction of a tangent to the direction around the rotation axis, the second magnetism collecting member includes a second straight portion which is linearly formed along a direction of a tangent to the direction around the rotation axis, the retaining portion includes:

a first magnetism-collecting-member retaining portion disposed in such a position as to retain the first straight portion and configured to limit a relative movement of the first magnetism collecting member with respect to the magnetism-collecting-member retaining member; and a second magnetism-collecting-member retaining portion disposed in such a position as to retain the second straight portion and configured to limit a relative movement of the second magnetism collecting member, the first magnetism-collecting-member retaining portion includes:

a first magnetism-collecting-member retaining portion body which extends in a rotation-axis direction of the rotary member and is elastically deformable; and a first axial limiting portion disposed at the first magnetism-collecting-member retaining portion body, opposed to an end surface of the first straight portion, the end surface being located on one side in the rotation-axis direction, the first axial limiting portion being configured to limit a relative movement of the first magnetism collecting member in the rotation-axis direction with respect to the magnetism-collecting-member retaining member, and the second magnetism-collecting-member retaining portion includes:

a second magnetism-collecting-member retaining portion body which extends in the rotation-axis direction and is elastically deformable; and a second axial limiting portion disposed at the second magnetism-collecting- member retaining portion body, opposed to an end surface of the second straight portion, the end surface being located on one side in the rotation-axis direction, the second axial limiting portion being configured to limit a relative movement of the second magnetism collecting member in the rotation-axis direction with respect to the magnetism-collecting-member retaining member.

* * * * *